United States Patent [19]

Hughes

[11] Patent Number: 4,646,072

[45] Date of Patent: Feb. 24, 1987

[54] LOCKING MEANS FOR GARAGE DOOR ACTUATOR SIGNAL TRANSMITTERS

[76] Inventor: George W. Hughes, 1421 Bringhurst, Houston, Tex. 77020

[21] Appl. No.: 731,150

[22] Filed: May 6, 1985

[51] Int. Cl.[4] .............................................. H04Q 9/14

[52] U.S. Cl. ..................................... 340/696; 455/95; 455/128

[58] Field of Search .............................. 340/696, 539; 200/330–332, 335, 153 T; 455/95, 99, 128

[56] References Cited

U.S. PATENT DOCUMENTS 4,121,160 10/1978 Cataldo .......................... 340/539 X 4,405,923 9/1983 Matsuoka et al. .............. 340/696 X

*Primary Examiner*—Glen R. Swann, III

*Assistant Examiner*—Thomas J. Mullen, Jr.

*Attorney, Agent, or Firm*—Ranseler O. Wyatt

[57] ABSTRACT

A locking device for garage door actuator signal transmission devices having a housing in which a signal transmission means is mounted, and into the circuit of which is installed normally open switches, with means for simultaneously manually operated separate actuators closing the said normally open switches actuating the door and for automatically opening said normally open switches upon release of said closing means, breaking the circuit through said main switch.

1 Claim, 4 Drawing Figures

LOCKING MEANS FOR GARAGE DOOR ACTUATOR SIGNAL TRANSMITTERS

BACKGROUND OF THE INVENTION

In door actuating mechanisms, an accidental pressure on the actuating switch, such as by pressure in a pocket, or an object inadvertently falling against the switch, or a child playing with the device, will actuate the door and cause it to open or to close, in many instances, without the knowledge of the owner. It is an object of this invention to provide means for locking the actuator against accidental operation.

SUMMARY OF THE INVENTION

A locking means for garage door actuator transmitters having a frequency keyboard and a transmitter for transmitting a signal to the receiver of an electronically actuated door actuating mechanism, and a normally open switch which, when closed, manually transmits a signal to the receiver which activates the door actuating mechanism.

DESCRIPTION OF THE PREFERRED EMBODIMENTS

Figure 1:
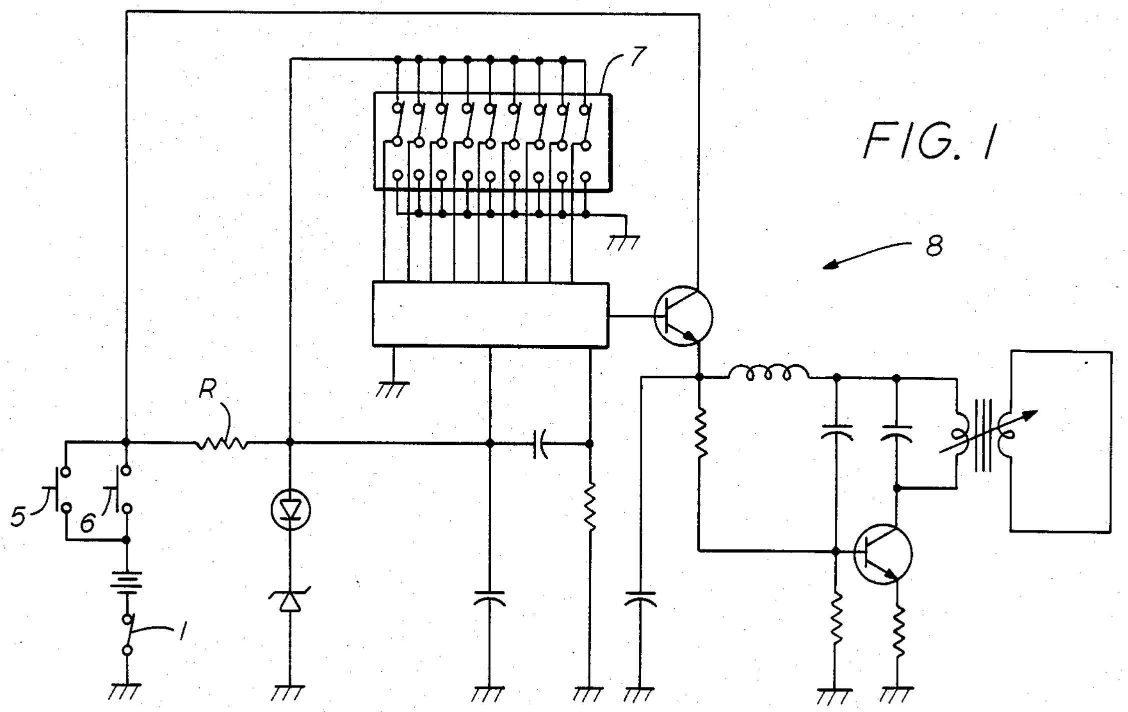
FIG. 1 is an electrical diagram of the circuits employed in the standard signal transmitting device.

In the drawings the numeral 1 designates the switch installed in the circuit in the signal transmitter housing 2, which is a normally open switch, and which is actuated by manually depressing the automatically retractable switch arm 3, shown mounted in one end of the housing 2. When this switch arm 3 is depressed, the switch 1 is closed and the lever 12 actuated to move one end thereof out of contact with the regular switch actuator 4 built in the housing 2 and which may be depressed in the usual manner, to contact the battery 11 and moving the main switches 5, 6 to closed position, transmitting a signal in the customary manner through the keyboard 7 which adjusts the frequencies of the transmission through the usual transmission means 8.

When the garage door (not shown) is closed, the first normally open switch 1 will be open, and the circuit can not be activated through the switches 5, 6 and accidental depression of the switch actuator 4 will not activate the door closer. A user may simultaneously depress lever 12 and the switch actuator 4 and the switch arm 3, and the circuit through the transmitter will be completed, and the door actuator will receive the signal and operate the door.

Figure 4:
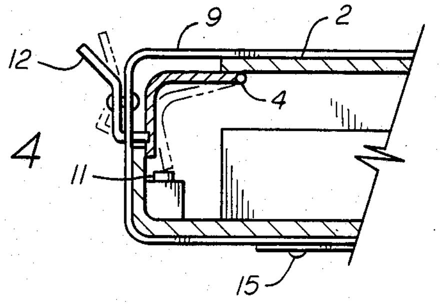
FIG. 4 is a partial cross sectional view of an actuator showing the modified form of the lock in the actuator and showing the switch in closed position.
Figure 2:
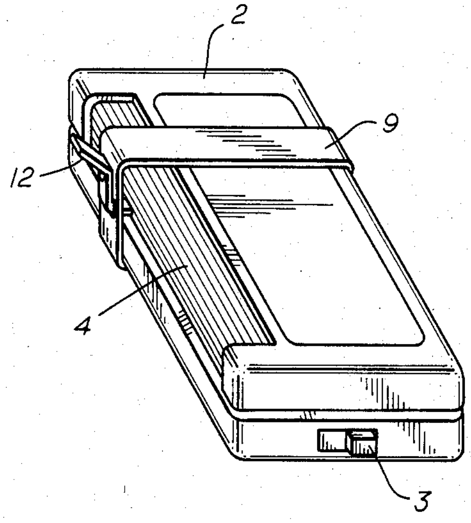
FIG. 2 is a front perspective view of an actuator showing another form of the lock in locked position.
Figure 3:
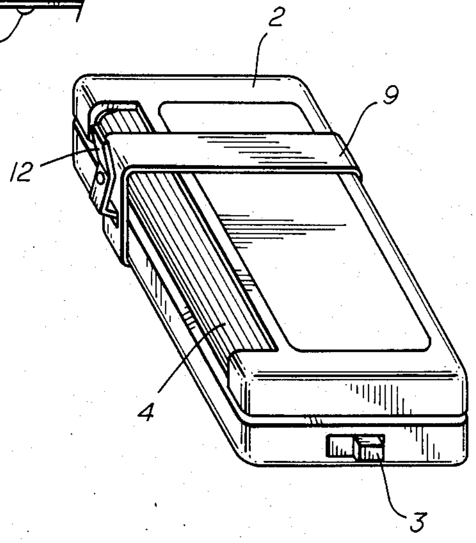
FIG. 3 is a front perspective view of an actuator having the modified form of the lock and the switch in closed position.

In the form shown in FIGS. 2, 3 and 4, the housing represents the standard present day signal transmitter, upon which a strap 9 is mounted, embracing the switch actuator 4. A lever 12 is pivotally mounted on the strap 9 and extends through the switch actuator 4 and a suitable depression in the switch 4 receiving the end of the lever 12. When in normal position, the actuator 4 is held against downward movement by means of the lever 12, and by pressure on the extended end of the lever 12, the lever 12 will swing outwardly, releasing the actuator 4, and permitting same to be manually moved downwardly and close the switches 5, 6 and thus transmit an actuating signal.

The strap 9 passes around the body of the housing 2, extending over the switch 4, and terminates beneath the housing 2, as at 15, and is designed to convert the presently used door openers to one having a lock against inadvertent opening.

REFERENCES

The above described locking means is designed to be used in openers having a transmittal circuit. Such transmission devices are similar to that described in U.S. Pat. Nos. 3,906,348 and 4,037,201.

What I claim is:

1. A locking means for garage door actuator signal transmitters, comprising a housing enclosing a transmitter, a manually operable first switch in said housing, a strap embracing said housing, a lever pivotally mounted on said strap, a manually movable member hingedly mounted on said housing forming a second switch, adapted to close a circuit through the signal transmitter when said switches are in closed position, said movable member of said second switch having means to receive the extended end of said lever when in an open position.

* * * * *